US011441531B2

(12) United States Patent
Yang et al.

(10) Patent No.: US 11,441,531 B2
(45) Date of Patent: Sep. 13, 2022

(54) SELF-POWERED REAL-TIME MONITORING SYSTEM FOR FLUID FLUSHING OF UNDERWATER FIXED FOUNDATION

(71) Applicant: Hunan Institute of Engineering, Xiangtan (CN)

(72) Inventors: Wenxian Yang, Xiangtan (CN); Kexiang Wei, Xiangtan (CN); Xiaofeng Geng, Xiangtan (CN); Liewei Ning, Xiangtan (CN); Xuejun Li, Xiangtan (CN)

(73) Assignee: Hunan Institute of Engineering, Xiangtan (CN)

( * ) Notice: Subject to any disclaimer, the term of this patent is extended or adjusted under 35 U.S.C. 154(b) by 467 days.

(21) Appl. No.: 16/634,751

(22) PCT Filed: Feb. 2, 2018

(86) PCT No.: PCT/CN2018/075125
§ 371 (c)(1),
(2) Date: Jan. 28, 2020

(87) PCT Pub. No.: WO2019/019601
PCT Pub. Date: Jan. 31, 2019

(65) Prior Publication Data
US 2020/0200141 A1 Jun. 25, 2020

(30) Foreign Application Priority Data

Jul. 28, 2017 (CN) .......................... 201710636093.0
Aug. 30, 2017 (CN) .......................... 201710765774.7

(51) Int. Cl.
*G01N 17/00* (2006.01)
*F03D 9/00* (2016.01)
(Continued)

(52) U.S. Cl.
CPC ............ *F03B 13/14* (2013.01); *G01L 5/0033* (2013.01); *G01N 17/00* (2013.01)

(58) Field of Classification Search
CPC ........ E21B 17/01; E21B 29/00; E21B 33/035; F17D 5/00; B63B 21/26; B63B 21/50;
(Continued)

(56) References Cited

U.S. PATENT DOCUMENTS 7,375,436 B1 * 5/2008 Goldin ...................... F03G 7/08
74/61
8,220,325 B2 7/2012 Baugh
(Continued)

FOREIGN PATENT DOCUMENTS

CN 202971047 U 6/2013
CN 107476934 A 12/2017
(Continued)

OTHER PUBLICATIONS

"International Application No. PCT/CN2018/075125, International Search Report and Written Opinion dated Apr. 26, 2018", (Apr. 26, 2018), 11 pgs.

*Primary Examiner* — Brandi N Hopkins
(74) *Attorney, Agent, or Firm* — Schwegman Lundberg & Woessner, P.A.

(57) ABSTRACT

Disclosed is a self-powered real-time monitoring system for fluid flushing of an underwater fixed foundation. Said system converts wave energy into electrical energy by means of a wind energy capturing module and a wave energy capturing module, and then uses the electrical energy to supply power to a settlement monitoring module, achieving the reduction of power consumption of the settling monitoring module during the detection of underwater surface settlement at the periphery of a fixed foundation.

14 Claims, 2 Drawing Sheets

(51) Int. Cl.
*F03B 13/16* (2006.01)
*F03B 13/14* (2006.01)
*G01L 5/00* (2006.01)

(58) Field of Classification Search
CPC ......... B63B 35/44; E01D 22/00; E01D 19/02; F03B 13/00; F03B 17/06; F03B 13/14; F03B 13/18; F03B 11/08; E02B 3/04; E02B 3/12; E02B 7/42; E02B 3/06; E02B 17/02; E02B 17/00; B63C 11/42; B63C 11/52; E02D 27/14; E02D 33/00; E02D 15/10; E02D 5/18; E02D 29/063; E02D 5/38; E02D 17/02; E02D 27/52; E02D 27/12; E02D 7/16; E02D 7/00; E04H 5/02; F03D 3/00; G01C 5/00; B65D 88/78

See application file for complete search history.

(56) References Cited

U.S. PATENT DOCUMENTS

| | | | |
|---|---|---|---|
| 2009/0196769 A1* | 8/2009 | Davis, Sr. | F03B 13/187 |
| | | | 137/544 |
| 2015/0198285 A1* | 7/2015 | Frazier | F17C 5/06 |
| | | | 405/210 |

FOREIGN PATENT DOCUMENTS

| | | |
|---|---|---|
| CN | 107576307 A | 1/2018 |
| WO | WO-2014196921 A1 | 12/2014 |
| WO | WO-2015070282 A1 | 5/2015 |
| WO | WO-2019019601 A1 | 1/2019 |

* cited by examiner

SELF-POWERED REAL-TIME MONITORING SYSTEM FOR FLUID FLUSHING OF UNDERWATER FIXED FOUNDATION

PRIORITY CLAIM TO RELATED APPLICATIONS

This application is a U.S. national stage filing under 35 U.S.C. § 371 from International Application No. PCT/CN2018/075125, filed on 2 Feb. 2018, and published as WO2019/019601 on 31 Jan. 2019, which claims the benefit under 35 U.S.C. 119 to Chinese Application No. 201710636093.0, filed on 28 Jul. 2017, and to Chinese Application No. 201710765774.7, filed on 30 Aug. 2017, the benefit of priority of each of which is claimed herein, and which applications and publication are hereby incorporated herein by reference in their entirety.

BACKGROUND OF THE INVENTION

1. Technical Field

The present invention relates to monitoring technology of underwater fluid flushing, and more particularly to a self-powered real-time monitoring system for fluid flushing of underwater fixed foundation.

2. Description of Related Art

Flushing is an unavoidable natural phenomenon happening when water currents flow by underwater fixed foundations. When water currents flow by a fixed foundation, the water currents can washout the riverbed around the fixed foundation, and remove silt and other deposits around the fixed foundation, thereby leading to the formation of pits around the fixed foundation. Once pits are formed around fixed foundations, the strength of the fixed foundations would be reduced. Under extreme climate load conditions such as storms and tsunamis, fixed foundations with low strength are highly likely to suddenly collapse without any omen. Much attention has been paid to fluid flushing of fixed foundations as described above in sectors of marine engineering such as hydraulic engineering, bridges, and ports.

Prior art normally monitors the settlement conditions of underwater surfaces around fixed foundations by implementing specific monitoring devices on the fixed foundations. For example, monitoring schemes adopting sonar, ultrasonic sensing, and optical fiber sensing are used. However, these monitoring devices require additional electrical energy to conduct their monitoring tasks, thereby increasing the overall power consumption.

SUMMARY OF THE INVENTION

The present invention provides a self-powered real-time monitoring system for fluid flushing of underwater fixed foundation for reducing power consumption.

In one aspect of the present invention, a self-powered real-time monitoring system for fluid flushing of an underwater fixed foundation is provided, which comprises: a fixed foundation, a permanent magnet generator having a generator rotor, a battery, a wind energy capturing module, a wave energy capturing module and a settlement monitoring module;

the permanent magnet generator being mounted on the fixed foundation, one end of the generator rotor being transmissively connected to the wind energy capturing module and the other end of the generator rotor being transmissively connected to a transmission unit of the wave energy capturing module;

a bracket being attached to one lateral of the fixed foundation, a supporting structure of the wave energy capturing module being mounted on the bracket, the transmission unit being mounted on the supporting structure; a floating unit of the wave energy capturing module being transmissively connected to the transmission unit; the floating unit being a ringlike member, the bracket having an extension column passing through the floating unit;

the floating unit being configured to float with waves, thereby driving the generator rotor through the movement of the transmission unit to generate electrical energy;

the battery being configured to store the electrical energy and supply power to the settlement monitoring module;

the settlement monitoring module comprising: a tension sensing module, a data collecting and processing module and a tugging portion; a container being attached to a bottom end of the extension column, the tension sensing module and the data collecting and processing module being arranged in the container;

one end of the tugging portion being slidably connected to the tension sensing module and the other end of the tugging portion being connected to a settlement probe; the settlement probe being freely laid on the underwater surface around the fixed foundation along a positioning sleeve;

the positioning sleeve being fixed to the fixed foundation; the settlement probe being configured to settle with settlement of the underwater surface due to its own gravity; and the tension sensing module acquiring real data about the settlement of the underwater surface as the tugging portion settles with the settlement probe, the measured data being analyzed and processed by the data collecting and processing module, and wherein the data collecting and processing module being connected to the tension sensing module.

Optionally, the transmission unit comprises a transmission rack, a gear assembly and a transmission chain assembly, the transmission rack and the floating unit being fixedly connected, the gear assembly connecting the transmission rack and the transmission chain assembly, the transmission rack using the gear component to convert wave energy into mechanical energy and transmit it to the transmission chain assembly, and the transmission chain assembly and the generator rotor being connected through an overrunning clutch.

Optionally, the transmission chain assembly comprises a chain, a driving gear and a driven gear, the chain being mounted around the driving gear and the driven gear, the driving gear being fixed to a connection shaft, and the driven gear being connected to the generator rotor through the overrunning clutch.

Optionally, there are two said transmission racks located at two sides of through hole of the floating unit, respectively; in which the extension column is located between the two transmission racks and passes through the through hole of the floating unit.

Optionally, the tension sensing module comprises at least one tension sensor and at least one spring, in which the tension sensor is connected to a first end of the spring, and a second end of the spring is connected to the tugging portion.

Optionally, the system further comprises a second bracket, in which the positioning sleeve is fixed to the second bracket, and the second bracket is fixed to the fixed foundation.

The disclosed self-powered real-time monitoring system for fluid flushing of an underwater fixed foundation converts wave energy into electrical energy by means of a wave energy capturing module, and then uses the electrical energy to supply power to a settlement monitoring module, achieving the reduction of power consumption of the settling monitoring module during the detection of underwater surface settlement around a fixed foundation.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings. Apparently, the drawings described below are some embodiments of the present invention. For one with ordinary skills in the art, other drawings can be derived from these drawings without paying any inventive effort.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention. Embodiments other than those described herein would be apparent to people of ordinary skill in the art without creative efforts.

Figure 1:
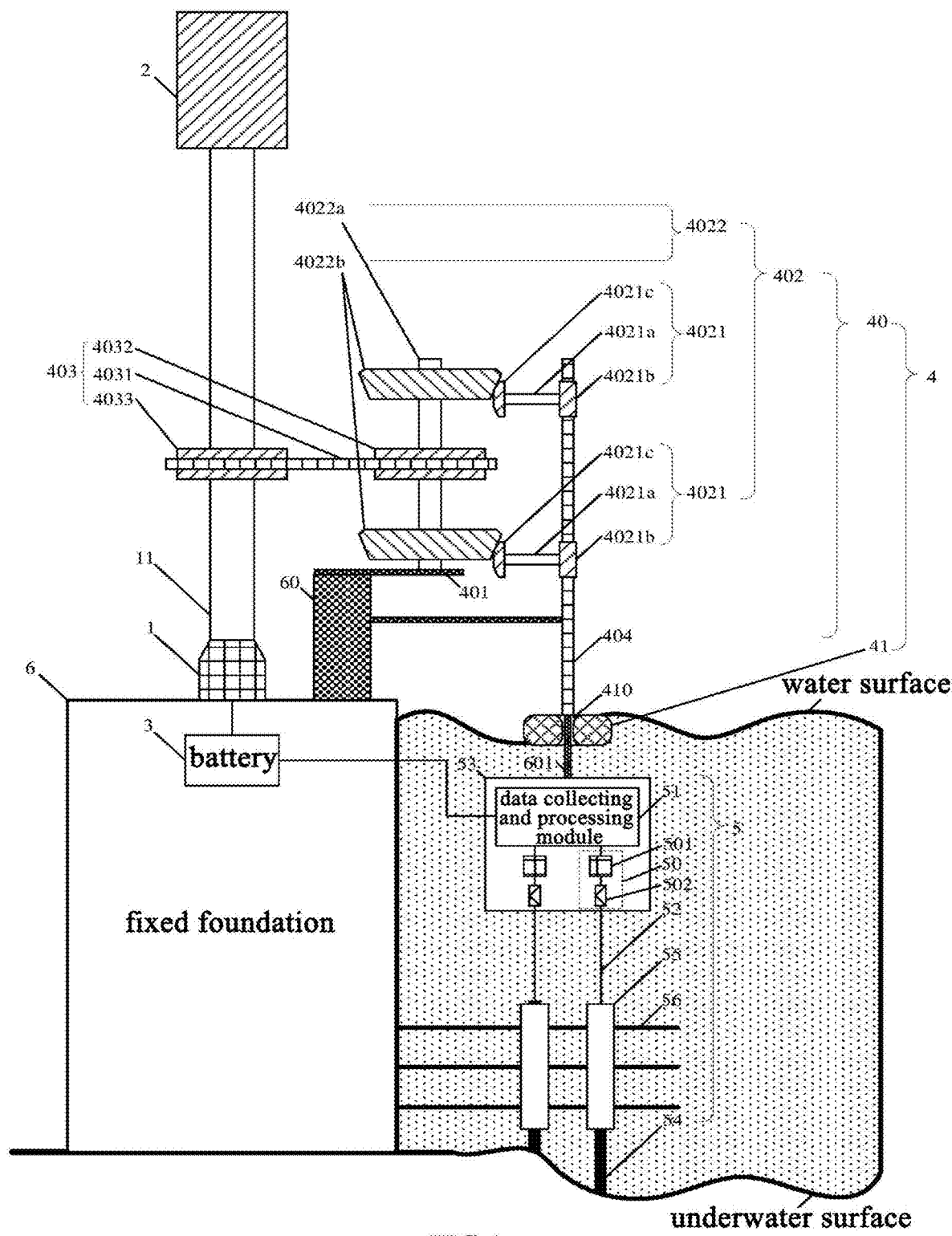
FIG. 1 is a schematic structural diagram of a self-powered real-time monitoring system for fluid flushing of an underwater fixed foundation according to one embodiment of the present invention.

FIG. 1 is a schematic structural diagram of a self-powered real-time monitoring system for fluid flushing of an underwater fixed foundation according to one embodiment of the present invention. As shown in FIG. 1, the system comprises a permanent magnet generator 1 comprising a generator rotor 11, a wind energy capturing module 2, a battery 3, a wave energy capturing module 4, a settlement monitoring module 5 and a fixed foundation 6.

The permanent magnet generator 1 is mounted on the fixed foundation 6. The generator rotor 11 has its one end transmissively connected to the wind energy capturing module 2 and has its opposite end transmissively connected to a transmission unit 40 of the wave energy capturing module 4.

A bracket 60 is attached to one lateral of the fixed foundation 6. The wave energy capturing module 4 has a supporting structure mounted on the bracket 60. The transmission unit 40 is mounted on the supporting structure 401. The wave energy capturing module 4 has a floating unit 41 transmissively connected to the transmission unit 40. The floating unit 41 is a ringlike member. The bracket 60 has an extension column 601 passing through a through hole 410 of the floating unit 41.

The floating unit 41 is configured to float with waves, thereby driving the generator rotor 11 through the movement of the transmission unit 40 to generate electrical energy.

The battery 3 is configured to store the electrical energy and supply power to the settlement monitoring module 5.

The settlement monitoring module 5 comprises: a tension sensing module 50, a data collecting and processing module 51 and a tugging portion 52. A container 53 is attached to a bottom end of the extension column 601. The tension sensing module 50 and the data collecting and processing module 51 are arranged in the container 53.

The tugging portion 52 has its one end slidably connected to the tension sensing module 50 and has its opposite end connected to a settlement probe 54. The settlement probe 54 is freely laid on the underwater surface around the fixed foundation 6 along a positioning sleeve 55.

The positioning sleeve 55 is fixed to the fixed foundation 6. The settlement probe 54 is configured to settle with the settlement of the underwater surface due to its own weight and the gravity.

The tension sensing module 50 acquires real data about the settlement of the underwater surface as the tugging portion 52 settles with the settlement probe 54. The measured data are analyzed and processed by the data collecting and processing module 51. The data collecting and processing module 51 is connected to the tension sensing module 50.

The disclosed self-powered real-time monitoring system for fluid flushing of an underwater fixed foundation uses a wave energy capturing module to convert wave energy into electrical energy, and then uses the electrical energy to supply power to a settlement monitoring module, achieving the reduction of power consumption of the settling monitoring module during the detection of underwater surface settlement around a fixed foundation.

Optionally, the transmission unit 40 comprises a transmission rack 404, a gear assembly 402 and a transmission chain assembly 403. The transmission rack 404 and the floating unit 41 are fixedly connected. The gear assembly 402 connects the transmission rack 404 and the transmission chain assembly 403. The transmission rack 404 uses the gear component to convert wave energy into mechanical energy and transmit it to the transmission chain assembly 403. The transmission chain assembly 403 and the generator rotor 11 are connected through an overrunning clutch.

Moreover, the gear assembly 402 comprises at least two transmission gear sets 4021 and at least one connection gear set 4022. The transmission gear set 4021 comprises a transmission shaft 4021a and a transmission straight gear 4021b and a transmission bevel gear 4021c that are fixed at intervals to the transmission shaft 4021a. The connection gear set 4022 comprises a connection shaft 4022a and two connection bevel gears 4022b that are fixed at intervals to the connection shaft 4022a. The transmission straight gear 4021b and the transmission rack 404 engage with each other. The transmission bevel gear 4021c mesh with one connection bevel gear 4022b. The connection shaft 4022a is connected to the transmission chain assembly 403.

Moreover, the transmission chain assembly 403 comprises a chain 4031, a driving gear 4032 and a driven gear 4033. The chain 4031 is mounted around the driving gear 4032 and the driven gear 4033. The driving gear 4032 is fixed to the connection shaft 4022a. The driven gear 4033 and the generator rotor 11 are connected through the overrunning clutch.

The transmission rack 404, the two transmission gear sets 4021b meshing with the transmission rack 404, the corresponding connection gear set 4022 and the connected transmission chain assembly 403 form a transmission group. When the transmission rack 404 moves upward or downward, only one transmission group generates electrical energy.

When transmission racks 404 slide upward due to the floating unit 41 affected by sea waves, the two transmission straight gears 4021b of one of the transmission racks 404 rotate anticlockwise, while the two transmission straight gears 4021b engaging with the other transmission rack 404 rotate clockwise. At this time, the anticlockwise rotating transmission straight gears 4021b work with the connection gear set 4022 engaging therewith and the corresponding transmission chain assembly 403 to convert wave energy into mechanical energy and transmit it to the generator rotor 11, and the permanent magnet generator 1 generates electrical energy by the generator rotor 11. The generated electrical energy is stored in the battery 3 and later used to supply power to the settlement monitoring module 5, thereby reducing power consumption of the settlement monitoring module 5. Therein, the transmission chain assembly 403 corresponding to the clockwise rotating transmission straight gears 4021b does not generate any torsion torque to the generator rotor 11 through the overrunning clutch.

When sea waves ebb, the transmission rack 404 moves downward due to its own weight and the weight of the floating unit 41. The two transmission straight gears 4021b rotate anticlockwise to drive the transmission bevel gear 4021c to rotate. The connection shaft 4022a and the connection bevel gear 4022b rotate together, thereby driving the driving gear 4032 and the chain 4031 to rotate. Meanwhile, the clockwise rotation of the driven gear 4033 generates a rotation torque to the generator rotor 11, thereby converting the gravitational potential energy of the transmission rack 404 and the floating unit 41 into electrical energy.

Figure 2:
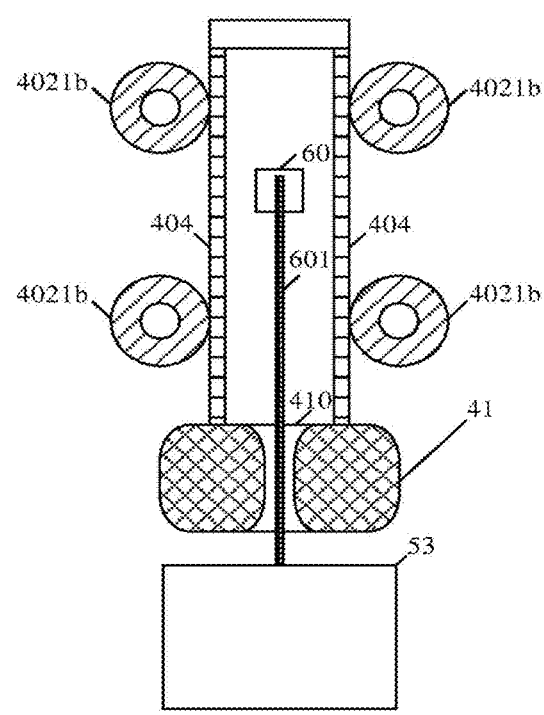
FIG. 2 is a front view diagram of an implemented structure of a transmission rack and an extension column bracket according to one embodiment of the present invention.

FIG. 2 is a front view diagram of an implemented structure of a transmission rack and an extension column bracket according to an embodiment of the present invention. As shown in FIG. 2, there are two transmission racks 404 located at two sides of the through hole 410 of the floating unit 41, respectively.

The extension column bracket 601 is located between the two transmission racks 404 while passing through the through hole 410 of the floating unit 41.

The transmission straight gears 4021b are located at two sides of the transmission rack 404, respectively.

Referring back to FIG. 1, the tension sensing module 50 includes at least one tension sensor 501 and at least one spring 502.

The tension sensor 501 is connected to a first end of the spring 502 while a second end of the spring 502 is connected to the tugging portion 52.

Moreover, referring to FIG. 1, the system further comprises a second bracket 56.

The positioning sleeve is fixed to the second bracket 56 and the second bracket 56 is fixed to the fixed foundation 6.

It is to be noted that the drawings may have the transmission rack and various gears as described in the foregoing embodiment omitted for clarity. Also, in order to show the components above, necessary brackets may be omitted in the above embodiments for the same reason.

People of ordinary skill in the art should appreciate that implementation of all or a part of the steps of the method as described in the foregoing embodiment may be realized using programs to command relevant hardware. The programs may be stored in a computer-readable storage medium, such as a ROM/RAM, a disk, a disc, and so on, so that execution of the programs causes implementation of the embodiments of the present invention.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A self-powered real-time monitoring system for fluid flushing of an underwater fixed foundation, comprising:
   a fixed foundation,
   a permanent magnet generator that comprises a generator rotor, and
   a wave energy capturing module;
   the permanent magnet generator is mounted on the fixed foundation, one end of the generator rotor is transmissively connected to a transmission unit of the wave energy capturing module;
   a bracket is attached to one lateral of the fixed foundation, a supporting structure of the wave energy capturing module is mounted on the bracket, the transmission unit is mounted on the supporting structure; a floating unit of the wave energy capturing module is transmissively connected to the transmission unit; the floating unit is a ringlike member, the bracket having an extension column passing through the floating unit; and
   the floating unit is configured to float with waves, thereby driving the generator rotor through movement of the transmission unit to generate the electrical energy.

2. The self-powered real-time monitoring system for fluid flushing of an underwater fixed foundation of claim 1, wherein the system further comprises a settlement monitoring module,
   the settlement monitoring module comprising: a tension sensing module, a data collecting and processing module and a tugging portion; a container is attached to a bottom end of the extension column, the tension sensing module and the data collecting and processing module are arranged in the container;
   one end of the tugging portion is slidably connected to the tension sensing module and the other end of the tugging portion is connected to a settlement probe; the settlement probe is freely laid on the underwater surface around the fixed foundation along a positioning sleeve;
   the positioning sleeve is fixed to the fixed foundation; the settlement probe is configured to settle with settlement of the underwater surface due to its own gravity; and
   the tension sensing module acquires real data about the settlement of the underwater surface as the tugging portion settles with the settlement probe, the measured data is analyzed and processed by the data collecting and processing module, and wherein the data collecting and processing module is connected to the tension sensing module.

3. The self-powered real-time monitoring system for fluid flushing of an underwater fixed foundation of claim 2, wherein the system further comprises a battery, the battery is configured to store the electrical energy and supply power to the settlement monitoring module.

4. The self-powered real-time monitoring system for fluid flushing of an underwater fixed foundation of claim 3, wherein the system further comprises a wind energy capturing module, the wind energy capturing module is transmissively connected to the other end of the generator motor.

5. The self-powered real-time monitoring system for fluid flushing of an underwater fixed foundation of claim 4, wherein the transmission unit comprises a transmission rack, a gear assembly and a transmission chain assembly, the transmission rack and the floating unit are fixedly connected, the gear assembly connects the transmission rack and the transmission chain assembly, the transmission rack uses gear components to convert wave energy into mechanical energy and transmit it to the transmission chain assembly, and the transmission chain assembly and the generator rotor are connected through an overrunning clutch.

6. The self-powered real-time monitoring system for fluid flushing of an underwater fixed foundation of claim 5, wherein the transmission chain assembly comprises a chain, a driving gear and a driven gear, the chain is mounted around the driving gear and the driven gear, the driving gear is fixed to the connection shaft, and the driven gear is connected to the generator rotor through the overrunning clutch.

7. The self-powered real-time monitoring system for fluid flushing of an underwater fixed foundation of claim 6, wherein there are two said transmission racks located at two sides of the through hole of the floating unit, respectively; in which
the extension column is located between the two transmission racks and passes through the through hole of the floating unit.

8. The self-powered real-time monitoring system for fluid flushing of an underwater fixed foundation of claim 4, wherein the tension sensing module comprises at least one tension sensor and at least one spring, in which
the tension sensor is connected to a first end of the spring, and a second end of the spring is connected to the tugging portion.

9. The self-powered real-time monitoring system for fluid flushing of an underwater fixed foundation of claim 8, further comprising a second bracket, in which
the positioning sleeve is fixed to second bracket, and the second bracket is fixed to the fixed foundation.

10. A transmission unit used for a wave energy capturing module which is especially configured in a self-powered real-time monitoring system for fluid flushing of an underwater fixed foundation,
wherein the transmission unit comprises a transmission rack, a gear assembly and a transmission chain assembly, the transmission rack is fixedly connected to a floating unit, the gear assembly connects the transmission rack and the transmission chain assembly, the transmission rack uses gear components to convert wave energy into mechanical energy and transmits it to the transmission chain assembly, and the transmission chain assembly is connected to a generator rotor through an overrunning clutch.

11. The transmission unit of claim 10, wherein the transmission unit is mounted on a supporting structure of the wave energy capturing module, a floating unit of the wave energy capturing module is transmissively connected to the transmission unit; the floating unit is a ringlike member, and an extension column of a bracket passes through the floating unit;
the floating unit is configured to float with waves, thereby driving the generator rotor through movement of the transmission unit to generate the electrical energy.

12. The transmission unit of claim 11, wherein the transmission chain assembly comprises a chain, a driving gear and a driven gear, the chain is mounted around the driving gear and the driven gear, the driving gear is fixed to the connection shaft, and the driven gear is connected to the generator rotor through the overrunning clutch.

13. The transmission unit of claim 12, wherein there are two said transmission racks located at two sides of a through hole of the floating unit, respectively; in which
the extension column is located between the two transmission racks and passes through the through hole of the floating unit.

14. The transmission unit of claim 13, wherein the self-powered real-time monitoring system for fluid flushing of an underwater fixed foundation further comprises a fixed foundation, a permanent magnet generator that comprises a generator rotor, a battery, a wind energy capturing module and a settlement monitoring module;
the permanent magnet generator is mounted on the fixed foundation, one end of the generator rotor is transmissively connected to the wind energy capturing module and the other end of the generator rotor is transmissively connected to a transmission unit of the wave energy capturing module;
a bracket is attached to one lateral of the fixed foundation, the supporting structure of the wave energy capturing module is mounted on the bracket,
the battery is configured to store the electrical energy and supply power to the settlement monitoring module;
the settlement monitoring module comprises: a tension sensing module, a data collecting and processing module and a tugging portion; a container is attached to a bottom end of the extension column, the tension sensing module and the data collecting and processing module are arranged in the container;
one end of the tugging portion is slidably connected to the tension sensing module and the other end of the tugging portion is connected to a settlement probe; the settlement probe is freely laid on the underwater surface around the fixed foundation along a positioning sleeve; the positioning sleeve is fixed to the fixed foundation; the settlement probe is configured to settle with settlement of the underwater surface due to its own gravity; and
the tension sensing module acquires real data about the settlement of the underwater surface as the tugging portion settles with the settlement probe, the measured data is analyzed and processed by the data collecting and processing module, and wherein the data collecting and processing module is connected to the tension sensing module.

\* \* \* \* \*